US009819539B2

(12) United States Patent
Thilderkvist et al.

(10) Patent No.: US 9,819,539 B2
(45) Date of Patent: Nov. 14, 2017

(54) JOINING A COMPUTER TO A PROCESS CONTROL SYSTEM

(71) Applicant: ABB Schweiz AG, Baden (CH)

(72) Inventors: Hans Thilderkvist, Malmo (SE); Thomas Pauly, Vasteras (SE); Jeff Harding, Holly Springs, NC (US)

(73) Assignee: ABB Schweiz AG, Baden (CH)

( * ) Notice: Subject to any disclaimer, the term of this patent is extended or adjusted under 35 U.S.C. 154(b) by 634 days.

(21) Appl. No.: 14/061,517

(22) Filed: Oct. 23, 2013

(65) Prior Publication Data
US 2014/0059193 A1 Feb. 27, 2014

Related U.S. Application Data

(63) Continuation of application No. PCT/EP2011/058709, filed on May 27, 2011.

(51) Int. Cl.
H04L 12/24 (2006.01)
G05B 19/418 (2006.01)

(52) U.S. Cl.
CPC .... *H04L 41/0806* (2013.01); *G05B 19/41855* (2013.01); *H04L 41/0883* (2013.01);
(Continued)

(58) Field of Classification Search
CPC ............. H04L 41/0806; H04L 41/0883; H04L 41/0886; G05B 19/41855;
(Continued)

(56) References Cited

U.S. PATENT DOCUMENTS 6,098,116 A 8/2000 Nixon et al.
7,188,161 B1 3/2007 O'Neil et al.
(Continued)

FOREIGN PATENT DOCUMENTS

CN 101398764 A 4/2009
EP 1802033 A1 6/2007
WO 2009030759 A2 3/2009

OTHER PUBLICATIONS

International Preliminary Report on Patenability Application No. PCT/EP2011/058709 Completed: Jul. 25, 2013 15 pages.
(Continued)

*Primary Examiner* — Dustin Nguyen
*Assistant Examiner* — Javier O Guzman
(74) *Attorney, Agent, or Firm* — Whitmyer IP Group LLC

(57) ABSTRACT

A setup control unit is configured to get activated via a first computer that is to become a node in the process control system and which activation is initiated by a setup tool being brought to the first computer. The setup control unit contacts a configuration control computer, supplies a setup tool identifier to the configuration control computer, accesses system information elements in the configuration control computer, presents system nodes to an operator using the system information elements, receives an operator selection of a system node, sends the node selection to the configuration control computer for registering, based on a setup tool identifier investigation, receives node parameter data associated with the selected system node from the configuration control computer and supplies the first computer with the node parameter data for making it into the selected system node.

16 Claims, 4 Drawing Sheets

(52) U.S. Cl.
CPC ............ *H04L 41/0886* (2013.01); *G05B 2219/24168* (2013.01); *G05B 2219/31098* (2013.01); *Y02P 90/185* (2015.11); *Y04S 40/162* (2013.01)

(58) Field of Classification Search
CPC .......... G05B 2219/24168; G05B 2219/31098; Y04S 40/162
USPC ...................................................... 709/224
See application file for complete search history.

(56) References Cited

U.S. PATENT DOCUMENTS

| | | | |
|---|---|---|---|
| 7,814,181 B1 | 10/2010 | O'Neil et al. | |
| 7,925,281 B2* | 4/2011 | Cahn ................ | H04W 68/00 370/241 |
| 2004/0100953 A1* | 5/2004 | Chen ................ | H04L 12/2602 370/389 |
| 2007/0093921 A1 | 4/2007 | Braun et al. | |
| 2008/0092128 A1* | 4/2008 | Corry ............... | G06F 11/3664 717/158 |
| 2008/0281953 A1 | 11/2008 | Blaisdell | |
| 2009/0280908 A1* | 11/2009 | Carroll ............. | A63F 13/10 463/42 |
| 2010/0131652 A1 | 5/2010 | Brewis et al. | |
| 2010/0269044 A1* | 10/2010 | Ivanyi .............. | G06Q 30/02 715/736 |
| 2012/0069748 A1* | 3/2012 | Van Den Bogaert | H04W 24/10 370/252 |
| 2012/0237034 A1* | 9/2012 | Karschnia ........ | H04W 12/04 380/270 |
| 2013/0279354 A1* | 10/2013 | Ekman ............. | H04W 24/00 370/252 |

OTHER PUBLICATIONS

International Search Report and Written Opinion of the International Searching Authority Application No. PT/EP2011/058709 Completed: Feb. 9, 2012; dated: Feb. 20, 2012 13 pages.

Written Opinion of the International Preliminary Examining Authority Application No. PCT/EP2011/058709 dated: May 16, 2013 4 pages.

* cited by examiner

JOINING A COMPUTER TO A PROCESS CONTROL SYSTEM

FIELD OF THE INVENTION

The present invention generally relates to a process control system. More particularly the present invention relates to a method, a node configuration setup arrangement fore secure joining of a computer as a node in a process control system as well as to a method and computer program product for controlling the joining of a new computer to a process control system and a configuration control device.

BACKGROUND OF THE INVENTION

Process control systems can be complex and comprise a number of different types of computers, such as operator work stations or terminals, engineering work stations or terminals, control servers and other types of control, monitoring and protection computers.

These control systems are furthermore typically delivered with a set of generic and configurable software functions for controlling and monitoring the process. The activity to configure this software for a specific application, i.e. to control a specific process, is commonly referred to as engineering, and is typically to a large extent performed on an engineering workstation, often before the rest of the computers in the system are connected or even delivered.

Engineering typically also includes defining the control system itself, including controllers, servers, and workstations, and how these are connected to each other over a control system network.

Computers are normally delivered from a manufacturer with a pre-installed operating system. Computers that are intended to be used as system nodes in a control system may also have control system specific software pre-installed.

The control systems do in many situations need to have a high security. If unauthorized computers are able to access a process control system, they may be able to disrupt the control of the industrial process, which can be dangerous and even fatal.

However a process control system is also not a fixed system, it may need the addition of new computers or the replacing of old computers. This means that there is a need for improved security when adding a computer to a process control system, either as a new node or as a replacement node.

Normally it is required that relevant software is pre-installed in the computer that is to be joined, or that web technologies are used for downloading components as they are needed. Pre-loading of software is time consuming, adding to the cost for joining the new computer. Web technologies are associated with security problems of various kinds.

There exist some prior art directed towards adding computers to computer systems.

U.S. Pat. No. 7,814,181 does for instance describe connecting a trusted configuration device to a network element, setting up a secure connection to a provisioning server and receiving a configuration from the server.

US 2008/0281953 describes establishing of a secure connection to an administrator device for obtaining configuration data for a computer.

US 2010/0131652 describes the provisioning of a configuration file that can be transferred to a computer via a transportable physical medium.

However, none of the documents are concerned with the problems of adding computers to a process control system.

There is thus a need for a way to connect computers to a control system that has an improved security.

SUMMARY OF THE INVENTION

The present invention is directed towards improving the security when joining computers to a process control system.

One object of the present invention is to provide a method for secure joining of a computer as a node in a process control system.

This object is according to a first aspect of the present invention achieved through a method for secure joining of a computer as a node in a process control system, the method being performed by a setup control unit and comprising the steps of:
 getting activated via a first computer, which computer is to become a node in the process control system, which activation is initiated by a setup tool being brought to the first computer,
 contacting a configuration control computer in the process control system,
 supplying a setup tool identifier to the configuration control computer,
 receiving node parameter data associated with the selected system node from the configuration control computer, said node parameter data being received based on an operator selection of a system node for the first computer and on a setup tool identifier investigation being performed in the configuration control computer, and
 providing the first computer with said node parameter data for making the first computer into the selected system node.

Another object of the present invention is to provide a node configuration setup arrangement for secure joining of a computer as a node in a process control system.

This object is according to a second aspect of the present invention achieved through a node configuration setup arrangement for secure joining of a computer as a node in a process control system comprising:
 a setup control unit configured to
  get activated via a first computer, which first computer is to become a node in the process control system, which activation is initiated by a setup tool being brought to the first computer,
  contact a configuration control computer in the process control system,
  supply a setup tool identifier to the configuration control computer,
  receive node parameter data associated with the selected system node from the configuration control computer, said node parameter data being received based on an operator selection of a system node for the first computer and on a setup tool identifier investigation being performed in the configuration control computer, and
  supply the first computer with the node parameter data for making the first computer into the selected system node.

Another object of the present invention is to provide a method of controlling the joining of a new computer to a process control system, which increases the security of the joining process.

This object is according to a third aspect of the invention achieved by a method of controlling the joining of a new computer to a process control system comprising the steps of:

being contacted, by a setup control unit, operated by a first computer to be joined to the process control system, receiving a setup tool identifier from the setup control unit, performing a setup tool identifier investigation, registering, based on the setup tool identifier investigation, the first computer as a system node, said system node having been selected by an operator based on the system information elements being presented to the operator, which elements define system nodes, and sending node parameter data associated with the selected system node to the setup control unit.

Another object of the present invention is to provide a configuration control device, which increases the security when joining a new computer to a process control system.

This object is according to a fourth aspect of the invention achieved by a configuration control device comprising a configuration control unit configured to:

get contacted by a setup control unit being operated by a first computer to be joined to the process control system, receive a setup tool identifier from the setup control unit, perform a setup tool identifier investigation, register, based on the setup tool identifier investigation, the first computer as a system node, said system node having been selected by an operator based on the system information elements being presented to the operator, which elements define system nodes, and send node parameter data to the setup control unit.

Another object of the present invention is to provide a computer program product for controlling the joining of a new computer to a process control system, which increases the security of the joining process.

This object is according to a fifth aspect of the invention achieved by a computer program product for controlling the joining of a new computer to a process control system, the computer program product comprising a data carrier with computer program code implementing a configuration control unit configured to, when the code is loaded in a configuration control computer:

get contacted by a setup control unit being operated by a first computer to be joined to the process control system, receive a setup tool identifier from the setup control unit, perform a setup tool identifier investigation, register, based on the setup tool identifier investigation, the first computer as a system node, said system node having been selected by an operator based on the system information elements being presented to the operator, which elements define system nodes, and send node parameter data to the setup control unit.

The present invention has a number of advantages. It increases the security of the process of joining computers to a process control system. This is furthermore done with a limited number of additional elements and may therefore be done at small additional costs.

BRIEF DESCRIPTION OF THE DRAWINGS

The present invention will in the following be described with reference being made to the accompanying drawings, where FIG. 1 schematically shows a process control system for controlling a process.

DETAILED DESCRIPTION OF THE INVENTION

In the following, a detailed description of preferred embodiments of the invention will be given.

Figure 1:
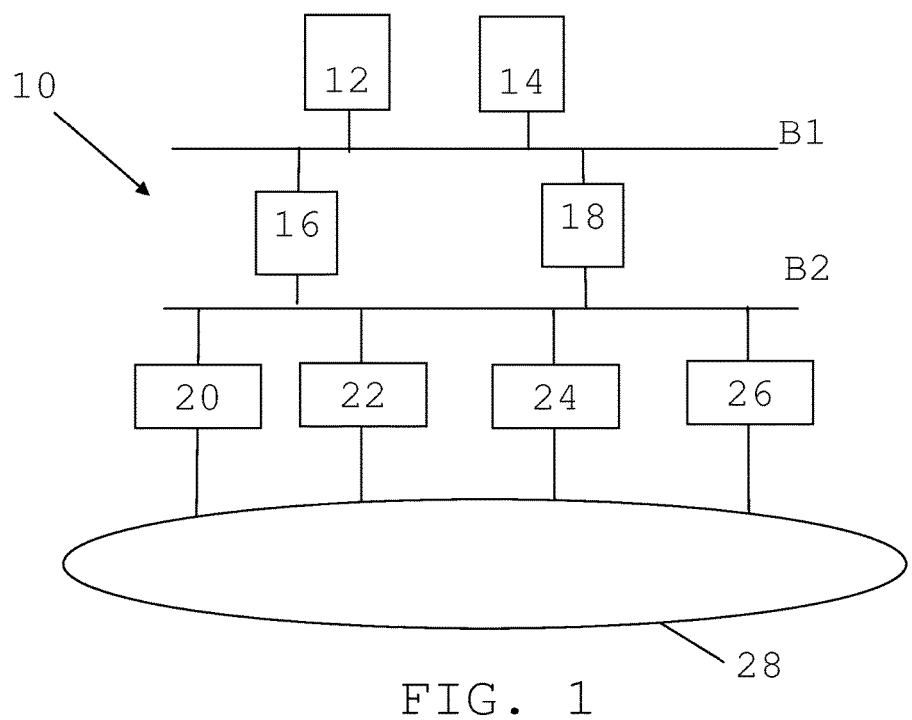

FIG. 1 schematically shows a control system 10 for a process 28, i.e. a process control system. The process 28 may be an industrial process and may furthermore be any of a number of different types of processes such as a pulp and paper production process, an oil refining process, an electric power transmission process or an electric power distribution process. The control system 10 may for instance be an object based computerised system for controlling the process 28.

In FIG. 1 the process control system 10 includes a number of computers 12 and 14 connected to a first bus B1. There is here a first computer 12 that is an operator terminal and a second computer that is an engineering terminal 14. There is furthermore a second bus B2 and between the first and second busses there are connected a control computer 16 providing control and monitoring of the process 28 and a protection computer 18 providing a protection function of the process. To the second bus B2 there are furthermore connected process interface units 20, 22, 24 and 26 for providing control of the process and for receiving measurement data from the process 28. In the figure there are provided four such process interface units 20, 22, 24 and 26 that interfaces the process 28. It should however be realized that there may be more or fewer of each of these units. It should here also be realized that some of these may only be provided for control, some only for measurements and some for both control and measurements. Such units are thus all involved in controlling the process 28 and in doing this also involved in measuring physical properties related to the process. The measured properties may here be properties of the process itself such as a voltage of or current running in a power line or the pulp temperature of a pulp and paper process. However the measured properties may also be properties of an interface unit, like for instance the temperature of a transformer. The process interface units 20, 22, 24 and 26 may therefore also provide information on their own properties or status.

It should also be realised that there may be many more control and protection computers as well as more engineering and operator terminals.

However, here only a limited number of computers are shown in order to give a clearer description of the principles of the present invention. In the example in FIG. 1, the operator terminal 12 is here a first computer to be added to the process control system while the engineering terminal 14 is a configuration control computer. It should however be realized that a computer to be added is not restricted to being an operator terminal. It can just as well be a server, an engineering terminal, a process control computer, a protection computer or any other type of computer that can be provided in the process control system.

Figure 2:
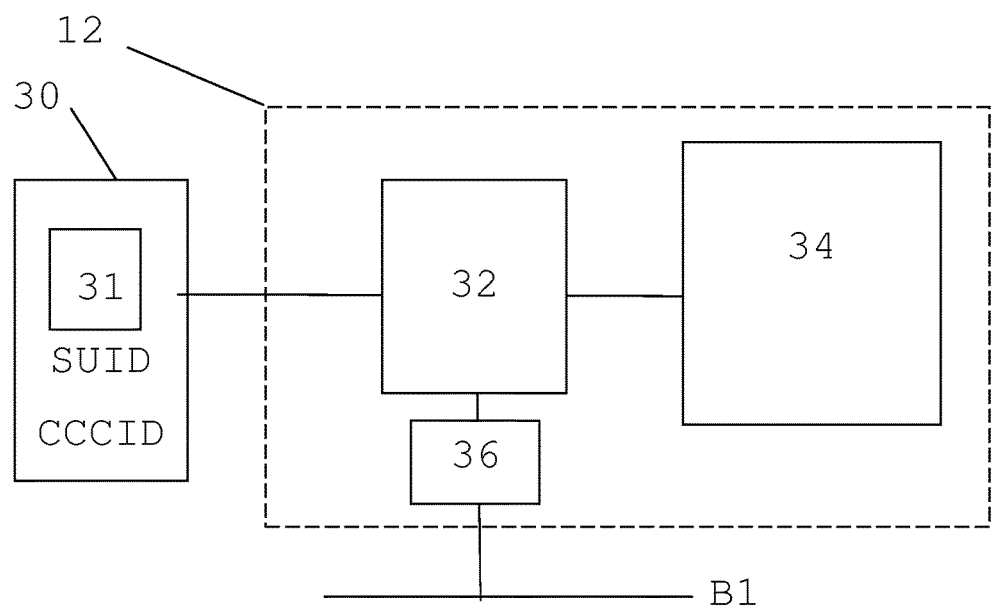
FIG. 2 shows a block schematic of a first computer in the process control system being connected to a data carrier on which a setup tool is provided.

FIG. 2 shows a block schematic of the first computer, which includes a processor 32 connected to a communication interface 36 for communicating with the first bus B1 as well as to a user interface 34, which user interface may be touch screen, i.e. a visual/tactile user interface. It can also be a combination of display and keyboard. However, also other types of user interfaces are possible such as audio user interfaces. There is also shown a memory 33 connected to the processor 32. On this memory 33 there is stored process control software or Node Functionality Software NFS. In FIG. 1 there is also shown a setup tool 30 comprising a setup control unit 31, a setup tool identifier SUID and a configuration control computer identity CCCID, i.e. an identity identifying a configuration control computer, which may be a network address used in the process control network. This address may be a temporary address associated with the specific setup activity to be performed. This setup control unit 31 is typically provided as computer program code which implements the setup control unit when being run by the processor 32 in the first computer 12.

Figure 3:
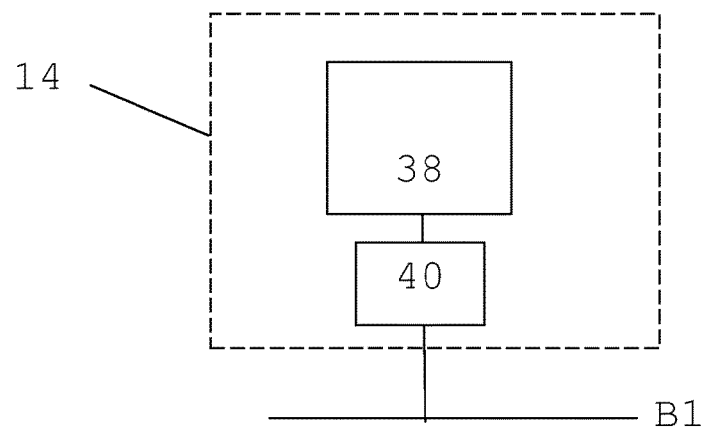
FIG. 3 shows a block schematic of a configuration control computer provided in the process control system.

FIG. 3 schematically shows the engineering terminal 14, which is acting as a configuration control computer. The system configuration control computer comprises a system configuration control unit 38, which may be provided as a processor with associated program code. The configuration control unit 38 is connected to a communication interface 40 for communicating with other entities of the process control network via the first bus B1. It should here be realized that also the configuration control computer may be equipped with a user interface. However, it has here been omitted in order to simplify the description of the present invention.

Figure 4:
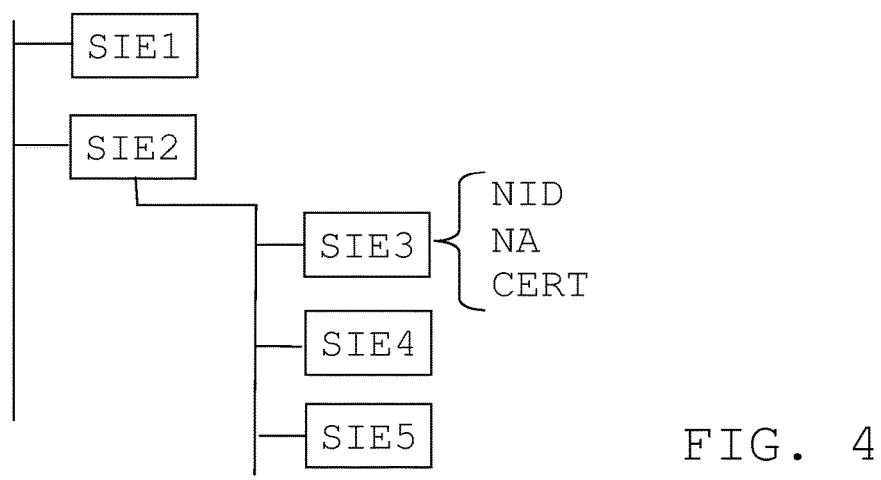
FIG. 4 schematically shows a number of information elements provided in a hierarchical process control system network structure.

FIG. 4 schematically shows a number of system information elements SEI1, SE12, SE13, SE14 and SEI5 provided in a logical structure representing the logical structure of the process control system network. Here a first and a second system information element SIE1 and SEI2 are provided on a first hierarchical level, while a third, fourth and fifth system information element SIE3, SIE4 and SIE5 are provided on a lower hierarchical level and here directly below the second system information element SEI2. The system information elements here all comprise a node identifier NID, a network node address NA and a certificate CERT.

Figure 5:
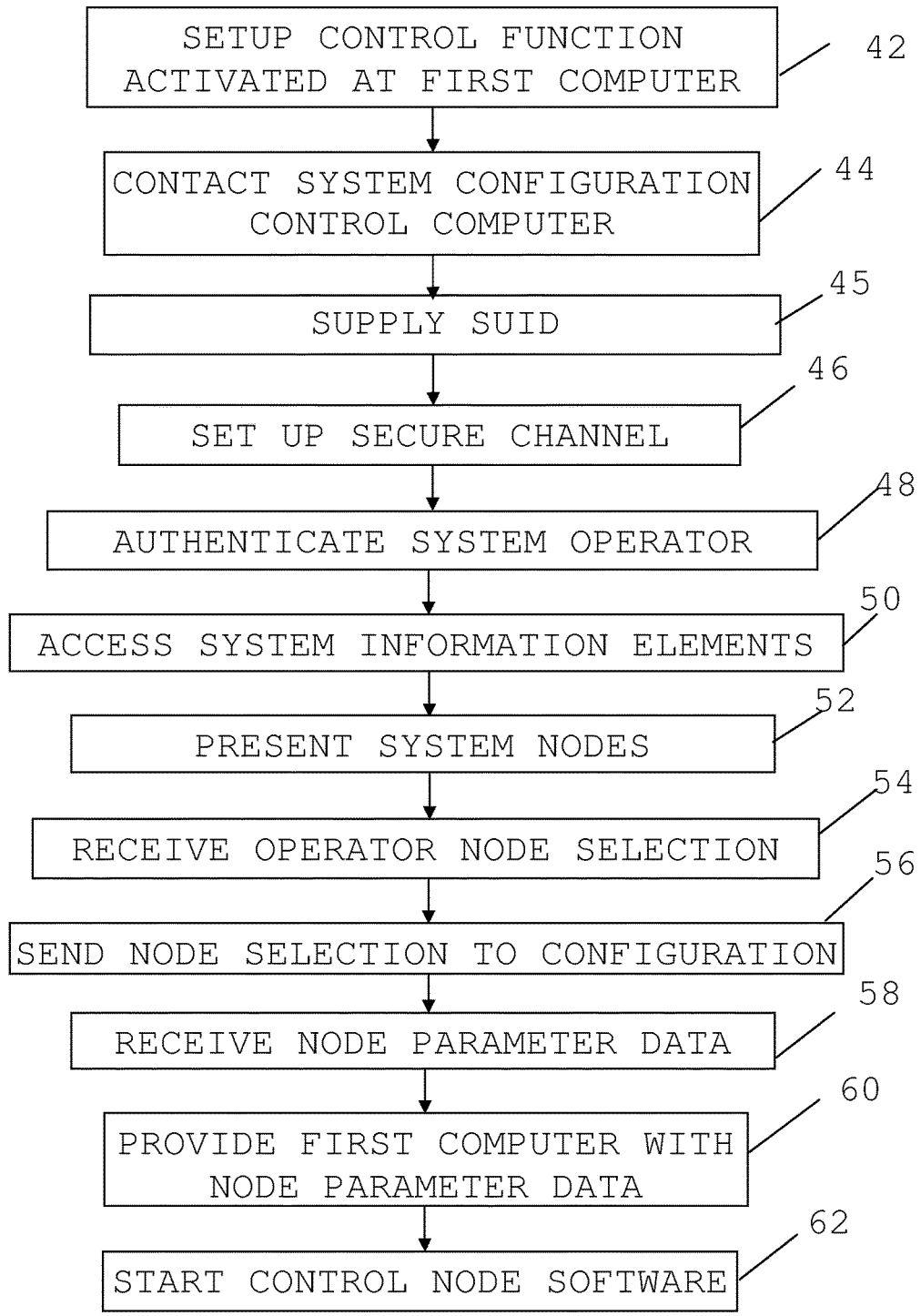
FIG. 5 shows a flow chart of a method for secure joining of a computer as a node in a process control system and being performed via the first computer by a setup control unit on the setup tool.
Figure 6:
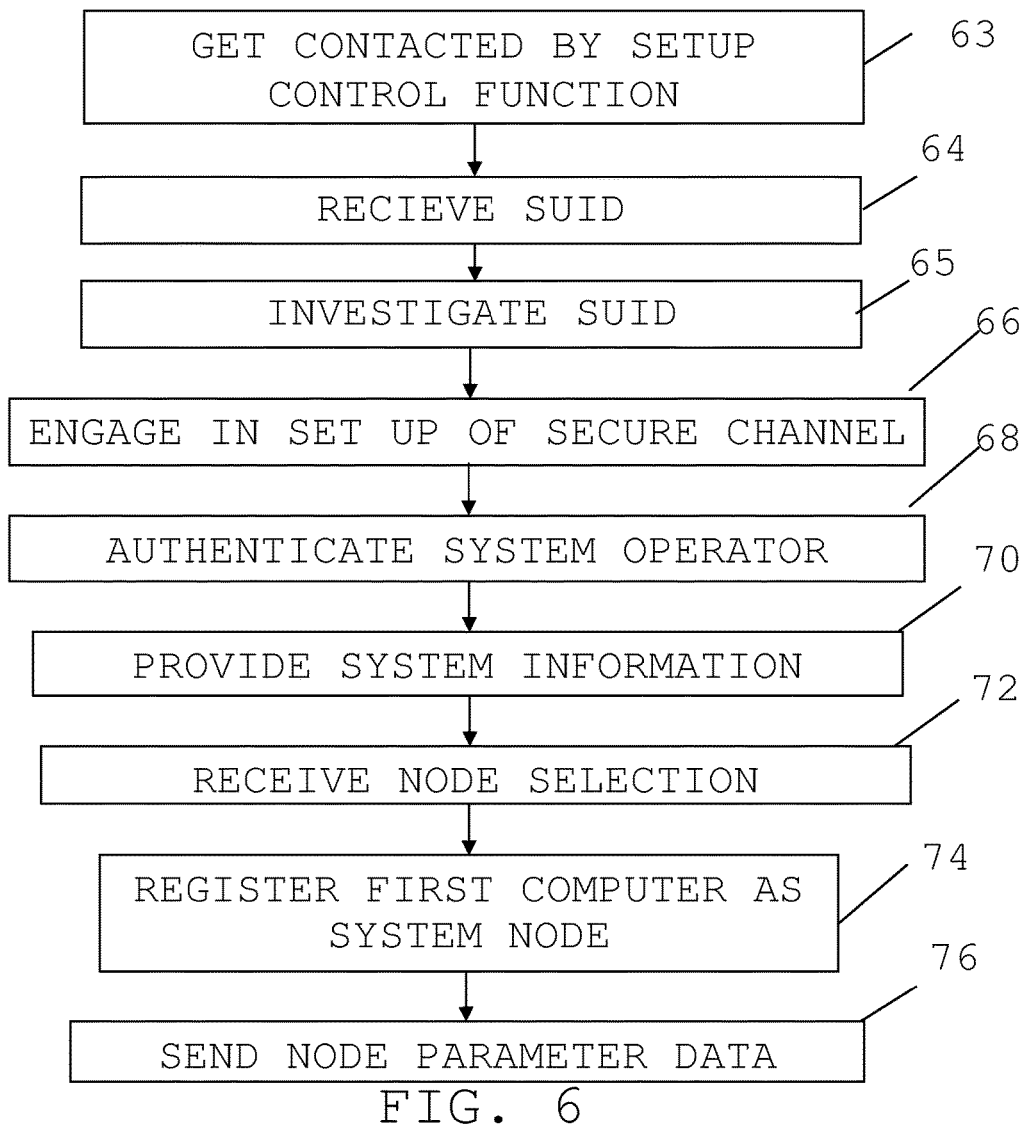
FIG. 6 schematically shows a flow chart of a method of controlling the joining of a new computer to a process control system being performed by the configuration control computer.

Now the functioning of the present invention according to a first embodiment of the invention will be described with reference being made to FIGS. 1, 2, 3 and 4 as well as to FIG. 5, which shows a flow chart of a method for secure joining of a computer as a node in a process control system and being performed by the setup control unit 31 via the first computer 12, and to FIG. 6, which schematically shows a flow chart of a method of controlling the joining of a new computer to the process control system being performed by the configuration control unit 38.

The first computer 12 is in this example a new computer to be added to the process control system 10. It may here be added when the control system is first set up, or as a new computer performing some new function because of the expansion of the process control system 10. As an alternative it may also be added as a replacement of another computer, for instance because a previous computer being old, faulty, of insufficient capacity or outdated functionality.

In doing this it is however important that the first computer is added in a secure way without jeopardizing the system. It is thus important that only those computers that are intended to be part of the control system are joined, and then being joined by authorized personnel only.

The invention also is directed towards ensuring that each computer that is joined is properly identified, without requiring any identification means that distinguish the computer from other computers. The invention makes this possible also when no specific software is pre-installed on the computer. The present invention is therefore provided for enabling a safe adding of the first computer 12 to the process control system 10.

When joining a computer as a system node in a control system, it is important that the computer is the intended one and placed in the intended location, so that each computer is correctly identified and can be set up with the correct software and system settings depending on its intended role in the system. As an example, a computer that is joined as a first operator terminal at one location, for instance in a first control room, must be distinguished from another operator terminal at another location, for instance in a second control room. It is possible that they should have completely different types of functionality. However, in order to make manufacturing and delivery logistics efficient, it is often undesirable to have pre-installed or pre-configured application specific identification means or setup parameters in the computers when they are delivered. Instead they should as far as possible be identical, for instance through being generic, regardless of which specific process or manufacturing plant they will be used in, and of the specific roles and locations they will have in the control system. Then they are updated with software and/or settings that are specific for the computer and/or location.

Process control systems are more and more connected to other, more or less open networks. At the same time there is an increasing requirement to make process control systems secure and resistant to intentional as well as unintentional cyber attacks and virus infections. To help achieve this purpose, various forms of cryptographic technologies can be used to ensure that only computers that are legitimate members of the process control system can participate in system internal communication 10. It then becomes important that only properly authenticated and authorized computers can be joined to the system, so that attempts to join a rogue computer as a system node are prevented—a rogue computer that can pose as a legitimate system node would represent a significant security risk. It is also important that only users with adequate privileges can join nodes to the system.

During engineering, system information elements SIE that represent network nodes may be created on an engineering workstation, e.g. in the form of software objects, or as entries in a database, or in any other suitable way. This engineering work station may be the second computer 14 acting as a configuration control computer. Each of these system information elements defines a system node with a unique node identity NID such as a name. It may also include or refer to other information, such as the network address NA to be used by the system node, and a certificate CERT that is unique for the node. In the example of FIG. 4 a system information element is considered to comprise all three items. However, the system information element SIE does not need to include information that identifies a particular physical machine. A system node may here be provided in a hierarchical node structure, for instance a tree. The system information elements SIE1, SIE2, SIE3, SIE4 and SIE5 may therefore also be linked to each other according to the hierarchical structure of the process control system, as depicted in FIG. 4. A further piece of information that may be provided is if the node has been previously selected, i.e. it if is free or occupied.

At this computer, which in this example is the configuration control computer 14, the setup tool 30 is created, which in the first embodiment of the invention comprises the setup control unit 31 and a unique identity of the setup tool SUID. In this embodiment the setup tool 30 also comprises a network identifier CCCID, such as a network address, associated with the configuration control computer 14.

The set up tool 30 is then brought to the first computer 12, which setup tool in a first embodiment of the invention is provided on a data carrier, for instance in the form of a removable memory medium, like a memory stick. This data carrier can then be physically brought to the first computer 10 by a system operator that is in charge of the joining operation. The data carrier may for instance be connected to a USB port of the first computer 12. The setup tool 30 may as an alternative be provided on another type of removable memory medium, such as a CD ROM disc or a smartcard, but could alternatively be stored on an access protected network share.

All information on the setup tool 30, including any computer program, may be signed by cryptographic means. This signature makes it possible to detect if the contents of the setup tool 30 has been tampered with.

The setup is thus being brought to the first computer 12. The computer being joined according to the principles of the present invention may be provided with or without specific pre-installed control system software.

As the setup tool is being brought to the first computer 12, the method being provided by the setup control unit 31 is then started through the setup control unit 31 being activated by the operator at the first computer 12 at the first computer, step 42.

Typically the setup control unit may be started through the processor 32 invoking computer program instructions provided on the data carrier. The unit may be started automatically by the data carrier being connected to the first computer. This may further be done through the insertion of the setup tool in the USB port and using plug and play functionality. As an alternative the operator may start the process control unit 31 through an active selection via the user interface 34 of the first computer 12. The activation is thus initiated by the setup tool 30 being brought to the first computer 12.

When the setup control unit 31 is activated or started, it contacts the configuration control computer 14, step 44. This contacting may be performed via the communication interface 36 and using the network identifier CCCID of the configuration control computer 14. The contacting may therefore involve sending a message addressed to the configuration control computer using the associated network identifier CCCID. This message may furthermore use a network identifier assigned to the first computer 12 as source address. This network identifier of the first computer 12 may be a temporary address that is obtained in different ways, of which some will be described later. The message would then include the setup tool identifier SUID as payload data in the message. In this way the setup tool identifier SUID is supplied to the configuration control computer, step 45.

The configuration control computer 14 thus gets contacted by the setup tool, for instance through receiving above-mentioned message, step 63. This message would then be received by the communication interface 40 and forwarded to the configuration control unit 38. In this way it also receives the setup tool identifier SUID, step 64. The configuration control unit 38 then investigates the setup tool identifier SUID, step 65. In case the identifier is not associated with a setup tool that has been created in the system, then all activities may be aborted. However in case the setup tool is a tool that has been created in the system, the setup control unit 31 and the configuration control unit 38 engage in setting up a secure connection between the two computers 12 and 14. Therefore the configuration control unit 38 engages in setting up a secure communication channel, step 66, and the setup control unit 31 engages in setting up a secure channel, step 46.

The successful investigation thus initiates the creation of a secure communication channel between the configuration control computer 14 and the first computer 12 that is to be joined. The communication channel can for example be secured by means of a certificate on the setup tool 30 provided for this purpose.

Thereafter the system operator is authenticated by the setup control unit 31 and the configuration control unit 38, steps 48 and 68. This may involve the setup control unit 31 prompting the operator to enter a user identity and password via the user interface 34, or by some other suitable means, such as a smartcard or biometric device, which data is then transferred over the secure connection, where the configuration control unit 38 checks the entered data with corresponding data that has been registered in the system concerning the operator. The setup activity may also in this case be aborted if the operator fails the check.

It can thus be seen that a configuration control unit 38 in the configuration control computer 14 receives a contact request from the first computer, which is identified as being a request from the set up tool and then this configuration control unit 38 engages in the setting up of a secure channel followed by the authentication of the operator. The identity of the operator and privileges may here be checked by the configuration control unit. If the operator then passes the authentication, the configuration control unit 38 sends data from the system information elements that define system nodes to the setup control unit 31, step 70. The data sent may here be only the names of the nodes or the complete element.

The setup control unit 31 then receives the system information and in this way the setup control unit 31 accesses the system information elements, step 50. It then presents the system nodes to the operator, step 52, which may be done via the user interface 34. It may for instance present a list of node identities NID to the operator. Preferably the list includes information on which identities are free and which have already been taken or which are already occupied.

The operator now selects the relevant identity to be assigned to the first computer, and provides an instruction that the computer is to join the system as the selected node, e.g. by clicking on a button in the user interface.

The selected identity could be one of the free ones, for a new node, or one previously used, if the first computer is replacing an existing node e.g. after a computer failure.

The setup control unit 31 thus receives the operator node selection, step 54, and then sends the selections to the configuration control unit 38, step 56.

The node selection is then received by the configuration control unit 38, step 72, which goes on and registers the first computer as the selected system node, step 74. It may here also set the selected node as being occupied in the system information element. Here it is also possible that a check is made if the selection is allowable or not.

Here it is also possible that the node selection is accompanied by other data about the joined node, for instance information about the physical machine such as a machine name or serial number or MAC address.

The configuration control unit 38 then starts to download relevant setup parameters to the setup control unit 31, which uses these parameters to set up the newly joined first computer. The configuration control unit 38 thus sends node parameter data to the setup control unit 31. These parameters can for example include the node's permanent network address, the node's identity in the control system, a node specific certificate, etc.

The setup control unit 31 thus receives the node parameter data 58, step 58, and then provides the first computer 12 with this node parameter data, step 60, for making the first computer 12 into the selected system node.

In this first embodiment the first computer includes the node functionality software NFS here also termed control system software, and in this case the parameter data may be sent or made available to this node functionality software NFS. In this case it is also possible that updates to this software are downloaded to ensure that the new node has the correct version. Here it is also possible that the setup control unit ensures that the first computer has been provided with all relevant security updates before it is accepted as a new node in the system. This also means that in case the first computer does not have the latest security updates, these will be downloaded from a the setup control computer or from another computer in the system that is responsible for security updates.

When the node parameter data have been made available to the first computer 12 and/or the download is finished, the node parameter data is thus applied in the node functionality software NFS and then the setup control unit 31 or the operator starts the control system software, step 62, which then takes over the control of the first computer 12. The first computer 12 now acts as a system node in the distributed process control system 10.

The setup tool 30 is removed from the first computer, i.e. the removable medium or network share is disconnected.

By repeating this procedure for each system node, the control system can easily be set up in a correct and secure way.

There are a number of ways in which the present invention may be varied. The setup tool does not need to include the setup control unit. As an alternative it is possible that this unit is provided on the first computer. In this case the setup tool may include a setup control unit invoking function, i.e. a function that invokes the setup control unit. This invoking function may be activated as soon as the setup tool is connected to the first computer. Also certificates used for secure channels may be omitted, which thus implies that the use of a secure channel can also be omitted.

The control system software was in the first embodiment described as being provided on the first computer. It is possible that this node functionality software is provided somewhere else and downloaded to the first computer. It may for instance also be provided on the setup tool, in the setup control computer or on an access protected network share. In this case the node functionality software is installed on the first computer before the node parameter data is provided to the first computer. This installing is typically performed after the setup tool, and possibly also the operator, have been authenticated by the setup control computer.

In case the node functionality software is provided on the setup tool, it is also possible to install it earlier.

The identifier of the setup tool may be in the form of a software certificate.

The network identifier of the configuration control computer may, as was mentioned earlier, be a network address. As an alternative it is also possible that no network identifier of the configuration control computer is included in the setup tool. Such an identifier may be provided in the first computer instead. It may then also be a predefined network address. As a further alternative it is possible that neither the setup tool nor the first computer comprises such a network identifier. In this case it is possible that a network identifier is obtained through for instance multicasting or broadcasting an initiation request on the process control system network 10, and receiving the network identifier as a response to the request. Other mechanisms are also possible. It is for instance possible to use a URL and connect to a name server.

The earlier described temporary network identifier, assigned to the new computer that is used during the setup procedure can be obtained in several different ways. It may be a temporary address provided on the setup tool. Alternatively it can be obtained from a network service such as DHCP (Dynamic Host Configuration Protocol), or manually entered by the user. Other ways to provide this network address are also possible.

It is obvious that some of the steps described above can be performed in a different order. For example, the setup tool can be created before the system nodes have been defined. As another example, the operator can select the identity of the new node before the authentication of the setup tool and the user is performed. As yet another example, the downloading of software components could take place before the download of setup parameters. Other variations are also possible.

In an alternative embodiment the information elements described above are deployed from the configuration control computer to a server in the control system, and all interaction during the joining process takes place between the new node and this server.

In control systems it is not uncommon that certain nodes, e.g. servers and controllers, are not equipped with a screen and keyboard or other interaction means suitable for presenting the system information elements. For this purpose, another embodiment of the invention alternatively allows a user interface of the configuration control computer to instead be used for presenting the system information elements. In this case connecting the setup tool to the new computer serves as a means to point out the computer that is to be joined, distinguishing it from other computers that may be connected to the network at the same time. In all other respects the joining procedure is as described above.

The setup tool is with advantage unique for the system, i.e. it can only be used in the system for which it was created. This can be accomplished by further including suitable secure identification means with the tool, such as a site specific certificate.

As was mentioned above the setup tool 30 maybe provided in the form of a data carrier computer program code providing the setup control unit, the setup tool identifier and the network identifier of the configuration control unit 38. However, it is also possible to provide the configuration control unit in this way.

Figure 7:
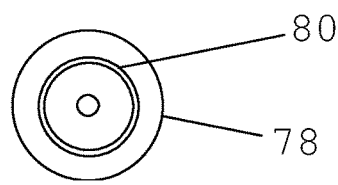
FIG. 7 schematically shows a data carrier carrying the program code for implementing the control unit.

A data carrier in the form of a CD ROM discs 78 carrying computer program code 80, which provides the above-described configuration control unit or setup tool is schematically shown in FIG. 7.

The setup control unit is provided in a node configuration setup arrangement, which arrangement comprises the first computer, when the setup control unit is provided in this computer, sometimes combined with the setup tool. When the setup control unit is provided in the setup tool the arrangement may be made up of the setup tool and may then furthermore be solely made up of the setup tool.

The configuration control computer may furthermore be considered to be a configuration control device.

From the foregoing discussion it is evident that the present invention can be varied in a multitude of ways. It shall consequently be realized that the present invention is only to be limited by the following claims.

What is claimed is:

1. A method for secure joining of a computer as a node in a process control system, the method being performed by a setup control unit of a setup tool having been created in the process control system and comprising a setup tool identifier providing a unique identity of the setup tool, the method comprising the steps of:
    getting the setup control unit activated via a first computer, which computer is to become a node in the process control system, which activation is initiated by the setup tool being brought to the first computer,
    contacting a configuration control computer in the process control system,
    supplying the setup tool identifier to the configuration control computer, in order for the configuration control computer to perform a setup tool identifier investigation,
    receiving node parameter data associated with the selected system node from said configuration control computer, said node parameter data being received based on an operator selection of a system node for the first computer and after a successful setup tool identifier investigation has been performed in the configuration control computer, and
    providing the first computer with said node parameter data for making the first computer into the selected system node.

2. The method according to claim 1, further comprising the steps of:
    accessing system information elements in the configuration control computer, which elements define system nodes,
    presenting the system nodes to an operator using the system information elements,
    receiving, by the setup control unit, an operator selection of a system node,
    sending the node selection to the configuration control computer for registering, based on the setup tool identifier investigation, the first computer as the selected system node at the configuration control computer.

3. The method according claim 2, wherein the setup control unit instructs the configuration control computer to present nodes and receive operator selections.

4. The method according to claim 1, further comprising receiving node functionality software from the configuration control computer and installing the node functionality software, and the step of providing the first computer with said node parameter data comprises applying said node parameter data in the node functionality software.

5. The method according to claim 1, wherein node functionality software is pre-installed on the first computer and the step of providing the first computer with said node parameter data comprises applying said node parameter data in the node functionality software.

6. The method according to claim 1, wherein the setup tool comprises node functionality software, the method further comprising the step of installing the node functionality software and the step of providing the first computer with said node parameter data comprises applying said node parameter data in the node functionality software.

7. A node configuration setup arrangement for secure joining of a computer as a node in a process control system comprising:
    a setup tool having been created in the process control system and comprising a setup tool identifier providing a unique identity of the setup tool and
    a setup control unit that:
        gets the setup control unit activated via a first computer, which first computer is to become a node in the process control system, which activation is initiated by the setup tool being brought to the first computer,
        contacts a configuration control computer in the process control system,
        supplies the setup tool identifier to the configuration control computer in order for the configuration control computer to perform a setup tool identifier investigation,
        receives node parameter data associated with the selected system node from said configuration control computer, said node parameter data being received based on an operator selection of a system node for the first computer and after a successful setup tool identifier investigation has been performed in the configuration control computer, and
        supplies the first computer with said node parameter data for making the first computer into the selected system node.

8. The node configuration setup arrangement according to claim 7, wherein the setup control unit further:
    accesses system information elements in the configuration control computer, which elements define system nodes,
    presents the system nodes to an operator using the system information elements,
    receives an operator selection of a system node, and
    sends the node selection to the configuration control computer for registering, based on the setup tool identifier investigation being performed in the configuration control computer, the computer as the selected system node at the configuration control computer.

9. The node configuration setup arrangement according to claim 7, comprising the first computer on which the setup control unit is provided.

10. The node configuration setup arrangement according to claim 7 wherein the setup tool comprises the setup control unit.

11. The node configuration setup arrangement according to claim 7, further comprising a memory on which the setup tool is provided as computer program code.

12. A method of controlling the joining of a new computer to a process control system comprising the steps of:
    being contacted, by a setup control unit of a setup tool having been created in the process control system and comprising a setup tool identifier providing a unique identity of the setup tool, said setup control unit being operated by a first computer to be joined to the process control system,
    receiving the setup tool identifier from the setup control unit,
    performing a setup tool identifier investigation,
    registering, after a successful setup tool identifier investigation, the first computer as a system node, said system node having been selected by an operator based on system information elements presented to the operator, which elements define system nodes, and sending node parameter data associated with the selected system node to the setup control unit.

13. The method according to claim 12, further comprising sending node functionality software to the set up control unit.

14. A configuration control device comprising a configuration control unit that:

gets contacted by a setup control unit of a setup tool having been created in the process control system and comprising a setup tool identifier providing a unique identity of the setup tool, said setup control unit being operated by a first computer to be joined to the process control system, receives the setup tool identifier from the setup control unit, performs a setup tool identifier investigation, registers, after a successful setup tool identifier investigation, the first computer as a system node, said system node having been selected by an operator based on the system information elements being presented to the operator, which elements define system nodes, and sends node parameter data to the setup control unit.

15. The configuration control device according to claim 14, wherein the configuration control unit further provides system information elements to the setup control unit and which elements define system nodes and receives the operator selection from the setup control unit.

16. A computer program product for controlling the joining of a new computer to a process control system, the computer program product comprising a data carrier with computer program code implementing a configuration control unit that, when the code is loaded in a configuration control computer:

gets contacted by a setup control unit of a setup tool having been created in the process control system and comprising a setup tool identifier providing a unique identity of the setup tool, said setup control unit being operated by a first computer to be joined to the process control system, receives the setup tool identifier from the setup control unit, performs a setup tool identifier investigation, registers, after a successful setup tool identifier investigation, the first computer as a system node, said system node having been selected by an operator based on the system information elements, being presented to the operator, which elements define system nodes, and sends node parameter data to the setup control unit.

\* \* \* \* \*